(12) United States Patent
Wang (10) Patent No.: US 12,115,815 B2
(45) Date of Patent: Oct. 15, 2024

(54) CAR WHEEL RIM DECORATION COVER FASTENING STRUCTURE

(71) Applicant: Superior Crown Material Co., Ltd., Tainan (TW)

(72) Inventor: Ming-Fang Wang, Tainan (TW)

(73) Assignee: Superior Crown Material Co., Ltd., Tainan (TW)

( * ) Notice: Subject to any disclaimer, the term of this patent is extended or adjusted under 35 U.S.C. 154(b) by 428 days.

(21) Appl. No.: 17/719,565

(22) Filed: Apr. 13, 2022

(65) Prior Publication Data

US 2023/0331036 A1    Oct. 19, 2023

(51) Int. Cl.
*B60B 7/06* (2006.01)
*B60B 7/00* (2006.01)
*B60B 7/04* (2006.01)
*B60B 7/08* (2006.01)

(52) U.S. Cl.
CPC ............ *B60B 7/063* (2013.01); *B60B 7/0013* (2013.01); *B60B 7/008* (2013.01); *B60B 7/04* (2013.01); *B60B 7/08* (2013.01)

(58) Field of Classification Search
CPC ........... B60B 7/008; B60B 7/04; B60B 7/063; B60B 7/066; B60B 7/08; B60B 7/12; B60B 7/0013
USPC ........ 301/37.102, 37.26, 37.27, 37.32, 37.33
See application file for complete search history.

(56) References Cited

U.S. PATENT DOCUMENTS

| | | | |
|---|---|---|---|
| RE18,417 E * | 4/1932 | Solenberger | F16J 9/20 277/472 |
| 2,112,425 A * | 3/1938 | Nixon | F16J 9/063 267/1.5 |
| 2,343,942 A * | 3/1944 | Teetor | F16J 9/203 277/486 |
| 2,436,896 A * | 3/1948 | Phillips | F16J 9/203 277/479 |
| 2,562,675 A * | 7/1951 | Mayfield | F16J 9/067 277/485 |
| 2,761,749 A * | 9/1956 | Marien | F16J 9/067 277/480 |
| 6,932,434 B2 * | 8/2005 | Wang | B60B 7/12 301/37.102 |

(Continued)

FOREIGN PATENT DOCUMENTS

| | | | | |
|---|---|---|---|---|
| CN | 108909351 A | * | 11/2018 | ............ B60B 7/06 |
| DE | 102020114463 A1 | * | 12/2021 | ............ B60B 7/00 |

(Continued)

*Primary Examiner* — Kip T Kotter
*Assistant Examiner* — Eva L Comino
(74) *Attorney, Agent, or Firm* — Chun-Ming Shih; LANWAY IPR SERVICES (57) ABSTRACT

A car wheel rim decoration cover fastening structure includes a wheel rim, a locking ring, a wheel rim cover, and a central cap. The wheel rim has a rim body and a central hole. The wheel rim has an inner flange formed in the central hole. The locking ring is mounted in the central hole of the wheel rim and locked on the inner flange of the wheel rim. The wheel rim cover has multiple locking blocks secured to the rim body of the wheel rim. The wheel rim cover corresponds to the locking ring. The central cap extends through the center of the wheel rim cover and is locked on the inside of the locking ring. The central cap presses the wheel rim cover. Thus, the wheel rim cover is fixed and will not be detached.

4 Claims, 8 Drawing Sheets

(56) References Cited

U.S. PATENT DOCUMENTS 7,204,562 B2 * 4/2007 Gerard ................. B60B 7/0013
301/37.11

FOREIGN PATENT DOCUMENTS

| EP | 0185102 | * | 6/1986 | ............... B60B 7/04 |
| FR | 3030368 A1 | * | 6/2016 | ........... B60B 7/0013 |
| JP | S63195471 | * | 8/1988 | ................. F18J 9/06 |
| KR | 100220218 B1 | * | 9/1999 | .............. F16B 39/00 |

* cited by examiner

CAR WHEEL RIM DECORATION COVER FASTENING STRUCTURE

BACKGROUND OF THE INVENTION

1. Field of the Invention

The present invention relates to a wheel rim assembly and, more particularly, to a car wheel rim decoration cover fastening structure.

2. Description of the Related Art

A conventional wheel rim assembly comprises a wheel rim, a wheel rim cover, and a central cap. The wheel rim cover and the central cap are used to enhance the aesthetic quality of the wheel rim. The wheel rim cover is provided with multiple locking blocks locked onto the wheel rim. However, the wheel rim cover is not securely attached to the wheel rim by the locking blocks so that the wheel rim cover will be detached from the wheel rim after installation, thereby affecting the safety of use of the conventional wheel rim assembly.

BRIEF SUMMARY OF THE INVENTION

The primary objective of the present invention is to provide a combination structure of a wheel rim cover and a central cap to prevent the wheel rim cover from being detached.

In accordance with one embodiment of the present invention, there is provided a wheel rim assembly comprising a wheel rim, a locking ring, a wheel rim cover, and a central cap. The wheel rim has a rim body and a central hole. The wheel rim has an inner flange formed in the central hole. The locking ring includes a ring body. The ring body has an outside formed with an enlarged portion protruding outward. The ring body has an inside provided with a groove corresponding to the enlarged portion. The ring body has an end formed with multiple positioning pieces protruding outward. The positioning pieces are arranged annularly. A predetermined interval is defined between the positioning pieces. Each of the positioning pieces has an outside formed with a locking edge protruding outward. Each of the positioning pieces has an inside provided with a positioning slot corresponding to the locking edge. The positioning slot has two ends extending to two sides of each of the positioning pieces respectively. The locking ring further includes a C-shaped first elastic circle. The first elastic circle is mounted in the positioning slot. The locking ring is mounted in the central hole of the wheel rim, and the locking edge is locked on the inner flange of the wheel rim. The wheel rim cover includes a wheel rim cover body. The wheel rim cover body has a center provided with a through hole penetrating the wheel rim cover body. The through hole has an inside formed with a protruding annular wall. The wheel rim cover body has an inner side face formed with multiple locking blocks. The locking blocks are used to lock the rim body of the wheel rim, and the annular wall corresponds to the ring body. The central cap includes a central cap body. The central cap body has an end formed with multiple fixing plates protruding outward. The fixing plates are arranged annularly. A predetermined interval is defined between the fixing plates. Each of the fixing plates has an outside formed with a protruding edge. Each of the fixing plates has an inside formed with a retaining groove. The central cap further includes a C-shaped second elastic circle mounted in the retaining groove. The central cap extends through the through hole of the wheel rim cover and is fitted into the ring body of the locking ring, so that the protruding edge is locked in the groove, and the central cap body presses the annular wall.

In accordance with another embodiment of the present invention, there is provided a wheel rim assembly comprising a wheel rim, a locking ring, a wheel rim cover, and a central cap. The wheel rim has a rim body and a central hole. The wheel rim has an inner flange formed in the central hole. The locking ring includes a ring body. The ring body has an outside formed with an enlarged portion protruding outward. The ring body has an inside provided with a groove corresponding to the enlarged portion. The ring body has an end formed with multiple positioning pieces protruding outward. The positioning pieces are arranged annularly. A predetermined interval is defined between the positioning pieces. Each of the positioning pieces has an outside formed with a locking edge protruding outward. Each of the positioning pieces has an inside provided with a positioning slot penetrating the locking edge. The locking ring further includes a C-shaped first elastic circle. The first elastic circle is formed with multiple insertion portions by bending. Each of the insertion portions is inserted into the positioning slot of one of the positioning pieces. The locking ring is mounted in the central hole of the wheel rim, and the locking edge is locked on the inner flange of the wheel rim. The wheel rim cover includes a wheel rim cover body. The wheel rim cover body has a center provided with a through hole penetrating the wheel rim cover body. The through hole has an inside formed with a protruding annular wall. The wheel rim cover body has an inner side face formed with multiple locking blocks. The locking blocks are used to lock the rim body of the wheel rim, and the annular wall corresponds to the ring body. The central cap includes a central cap body. The central cap body has an end formed with multiple fixing plates protruding outward. The fixing plates are arranged annularly. A predetermined interval is defined between the fixing plates. Each of the fixing plates has an outside formed with a protruding edge. Each of the fixing plates has an inside formed with a retaining groove. The central cap further includes a C-shaped second elastic circle mounted in the retaining groove. The central cap extends through the through hole of the wheel rim cover and is fitted into the ring body of the locking ring, so that the protruding edge is locked in the groove, and the central cap body presses the annular wall.

In assembly, the locking ring is pressed into the central hole of the wheel rim, so that the locking edge passes and is locked on the inner flange of the wheel rim. Then, the locking blocks of the wheel rim cover are mounted on and secured to the rim body of the wheel rim, with the annular wall corresponding to the ring body. Then, the central cap extends through the through hole of the wheel rim cover and is pressed into the ring body of the locking ring, so that the protruding edge is locked in the groove of the ring body, and the central cap body presses the annular wall.

Accordingly, the central cap is locked onto the locking ring to press the wheel rim cover after the locking ring is locked onto the wheel rim, so that the wheel rim cover is fixed securely, thereby preventing the wheel rim cover from being detached from the wheel rim.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a wheel rim assembly in accordance with the preferred embodiment of the present invention comprises a wheel rim 4, a locking ring 1, a wheel rim cover 2, and a central cap 3.

The wheel rim 4 has a rim body 41 and a central hole 42. The wheel rim 4 has an inner flange 43 formed in the central hole 42.

The locking ring 1 includes a ring body 11. The ring body 11 has an outside formed with an enlarged portion 12 protruding outward. The ring body 11 has an inside provided with a groove 13 corresponding to the enlarged portion 12. The ring body 11 has an end formed with multiple positioning pieces 14 protruding outward. The positioning pieces 14 are arranged evenly and annularly. A predetermined interval is defined between the positioning pieces 14. Each of the positioning pieces 14 has a predetermined radian. Each of the positioning pieces 14 has an outside formed with a locking edge 15 protruding outward. Each of the positioning pieces 14 has an inside provided with a positioning slot 16 corresponding to the locking edge 15. The positioning slot 16 has two ends extending to two sides of each of the positioning pieces 14 respectively. The locking ring 1 further includes a C-shaped first elastic circle (or loop) 17. The first elastic circle 17 is mounted in the positioning slot 16. The locking ring 1 is mounted in the central hole 42 of the wheel rim 4, and the locking edge 15 is locked on the inner flange 43 of the wheel rim 4.

The wheel rim cover 2 includes a wheel rim cover body 21. The wheel rim cover body 21 has a center provided with a through hole 22 penetrating the wheel rim cover body 21. The through hole 22 has an inside formed with a protruding annular wall 23. The wheel rim cover body 21 has an inner side face formed with multiple locking blocks 24. The locking blocks 24 are used to lock the rim body 41 of the wheel rim 4, and the annular wall 23 corresponds to the ring body 11.

The central cap 3 includes a central cap body 31. The central cap body 31 has an end formed with multiple fixing (or securing) plates 32 protruding outward. The fixing plates 32 are arranged evenly and annularly. A predetermined interval is defined between the fixing plates 32. Each of the fixing plates 32 has a predetermined radian. Each of the fixing plates 32 has an outside formed with a protruding edge 33. Each of the fixing plates 32 has an inside formed with a retaining groove 34 corresponding to the protruding edge 33. The central cap 3 further includes a C-shaped second elastic circle (or loop) 35 mounted in the retaining groove 34. The central cap 3 extends through the through hole 22 of the wheel rim cover 2 and is fitted into the ring body 11 of the locking ring 1, so that the protruding edge 33 is locked in the groove 13, and the central cap body 31 presses the annular wall 23.

In practice, each of the positioning pieces 14 and the first elastic circle 17 have the same radian, so that the first elastic circle 17 is fitted into the positioning slot 16 closely.

In assembly, the locking ring 1 is pressed into the central hole 42 of the wheel rim 4, so that the locking edge 15 passes and is locked on the inner flange 43 of the wheel rim 4. Then, the locking blocks 24 of the wheel rim cover 2 are mounted on and secured to the rim body 41 of the wheel rim 4. Then, the central cap 3 extends through the through hole 22 of the wheel rim cover 2 and is pressed into the ring body 11 of the locking ring 1, so that the protruding edge 33 is locked in the groove 13 of the ring body 11, and the central cap body 31 presses the annular wall 23.

Accordingly, the central cap 3 is locked onto the locking ring 1 to press the wheel rim cover 2 after the locking ring 1 is locked onto the wheel rim 4, so that the wheel rim cover 2 is fixed securely, thereby preventing the wheel rim cover 2 from being detached from the wheel rim 4.

Figure 1:
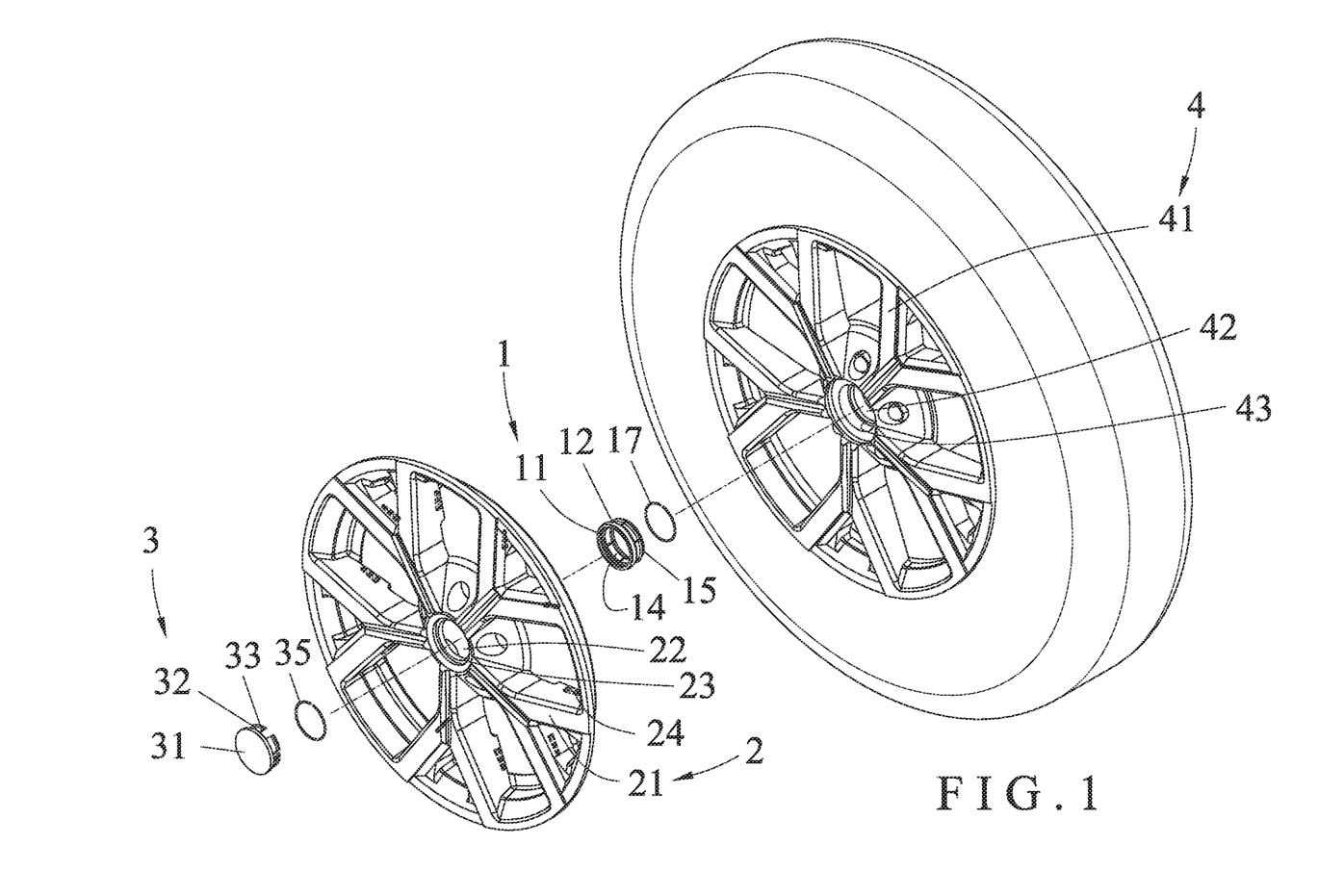
FIG. 1 is an exploded perspective view of a wheel rim assembly in accordance with the preferred embodiment of the present invention.
Figure 2:
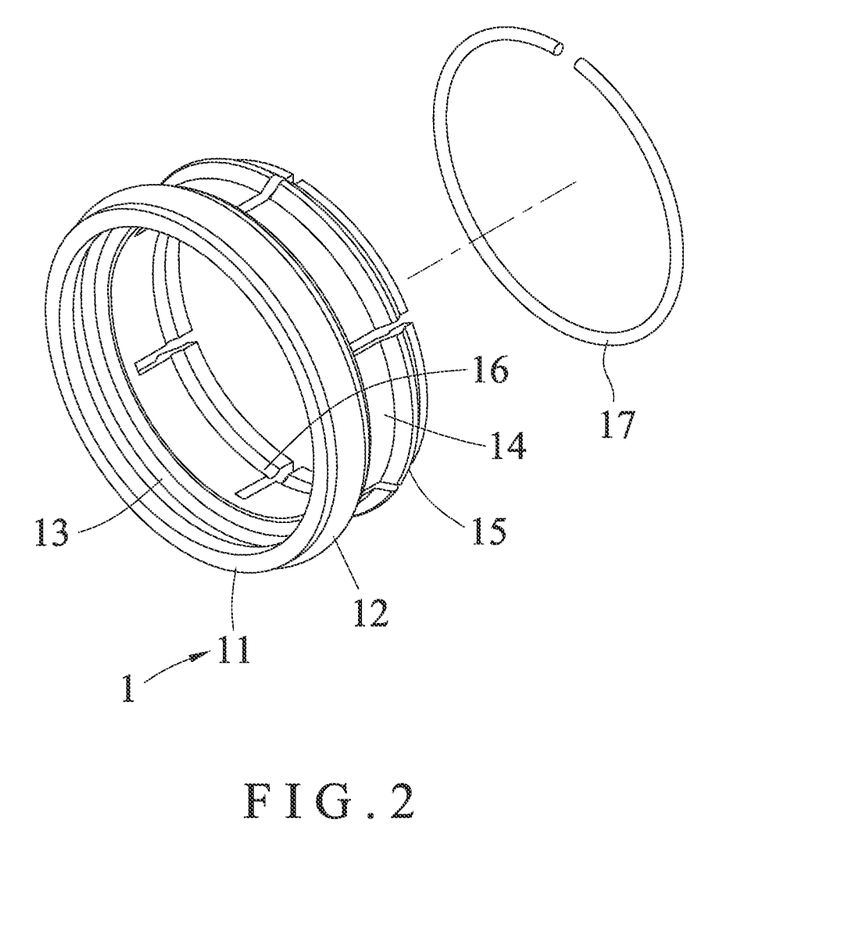
FIG. 2 is an exploded perspective view of a locking ring of the wheel rim assembly in accordance with the preferred embodiment of the present invention.
Figure 3:
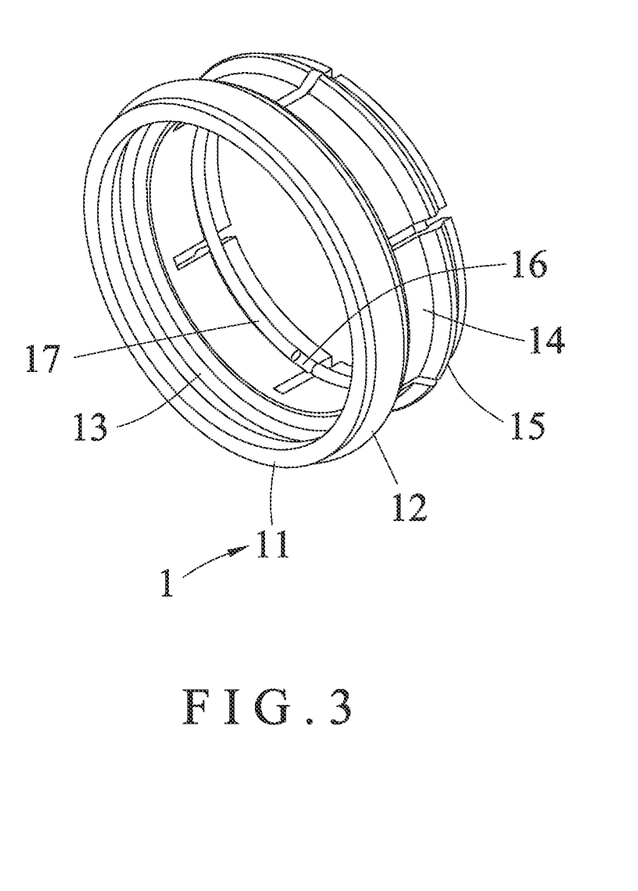
FIG. 3 is a perspective assembly view of the locking ring of the wheel rim assembly as shown in FIG. 2.
Figure 4:
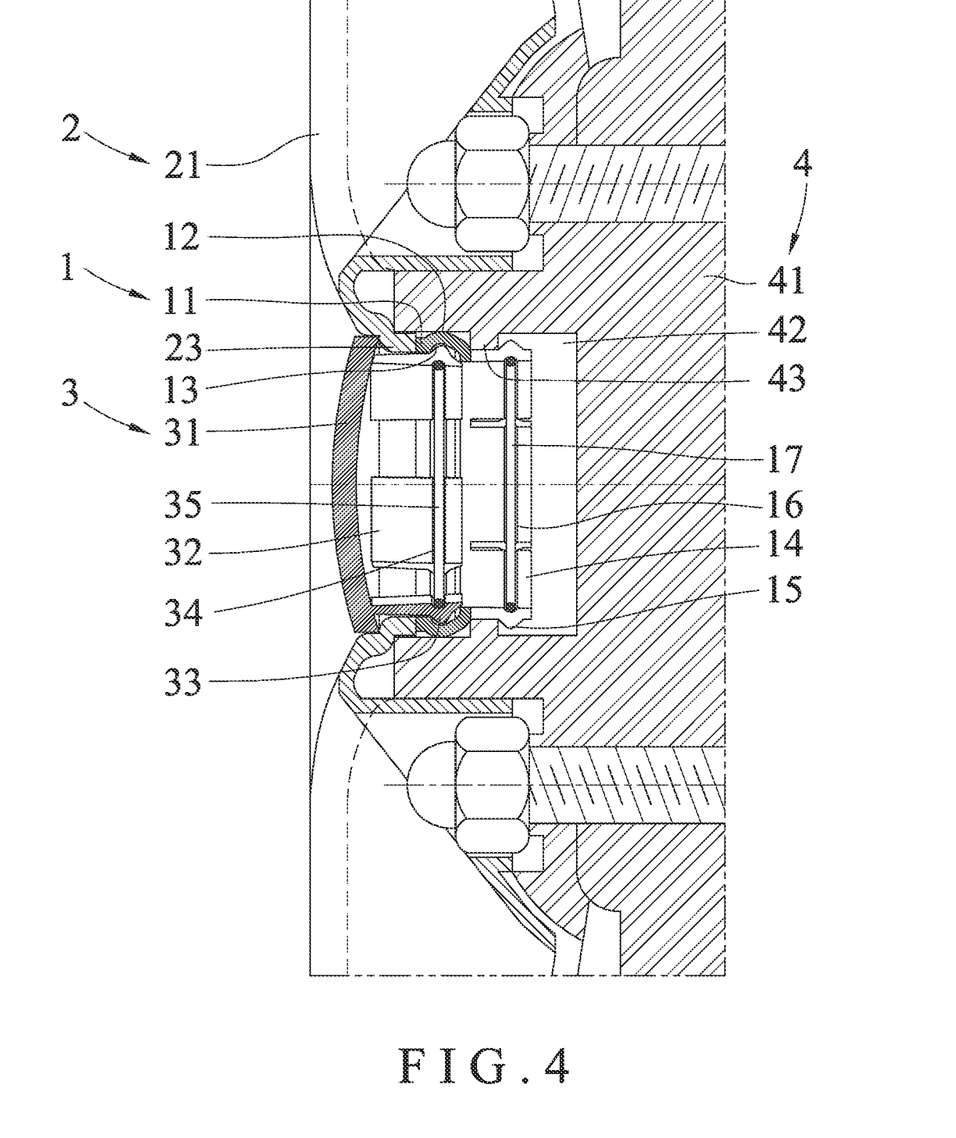
FIG. 4 is a cross-sectional view of the wheel rim assembly in accordance with the preferred embodiment of the present invention.
Figure 5:
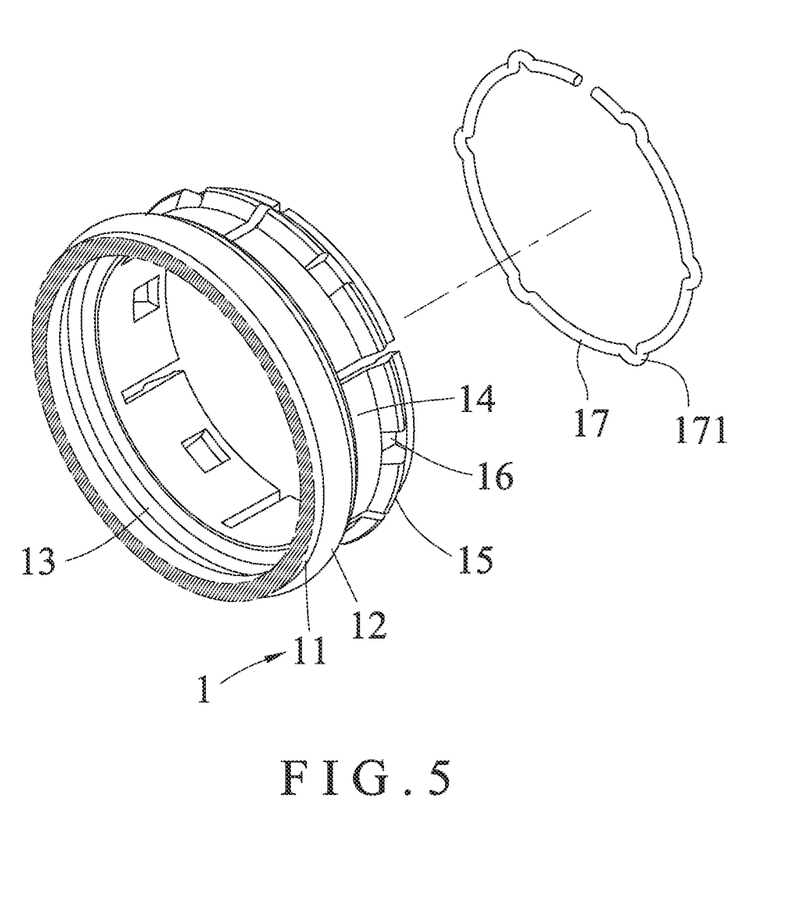
FIG. 5 is an exploded perspective view of a locking ring of the wheel rim assembly in accordance with the second preferred embodiment of the present invention.
Figure 6:
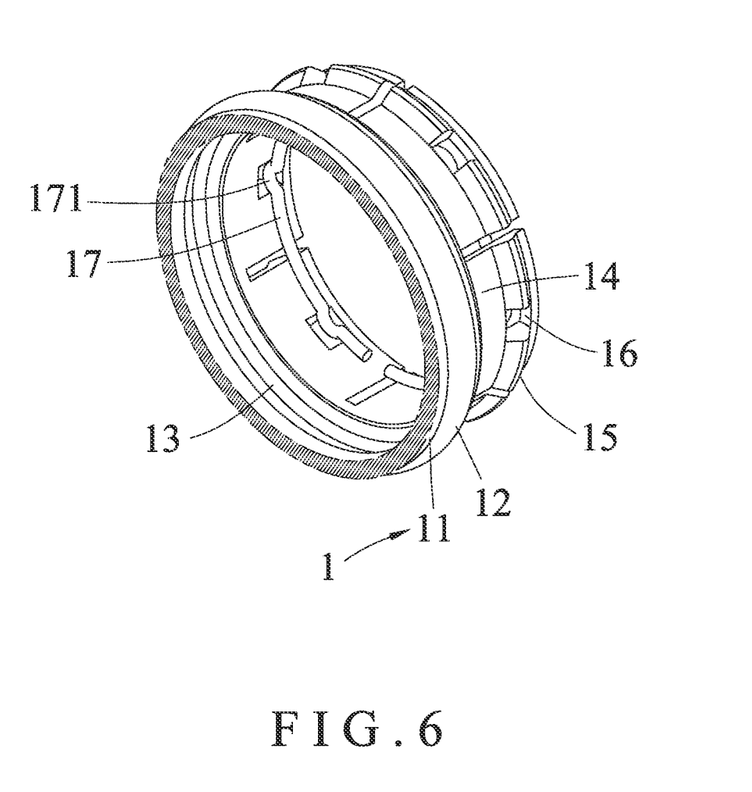
FIG. 6 is a perspective assembly view of the locking ring of the wheel rim assembly as shown in FIG. 5.
Figure 7:
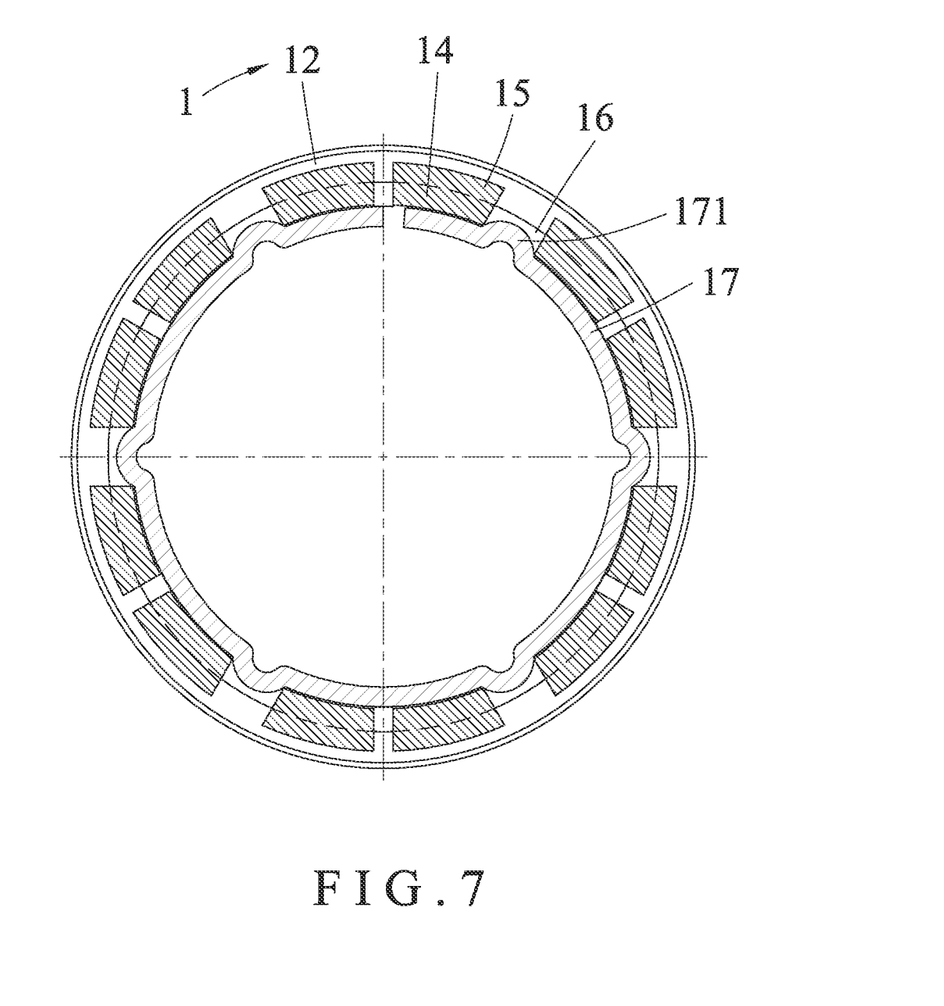
FIG. 7 is a cross-sectional assembly view of the locking ring of the wheel rim assembly in accordance with the second preferred embodiment of the present invention.
Figure 8:
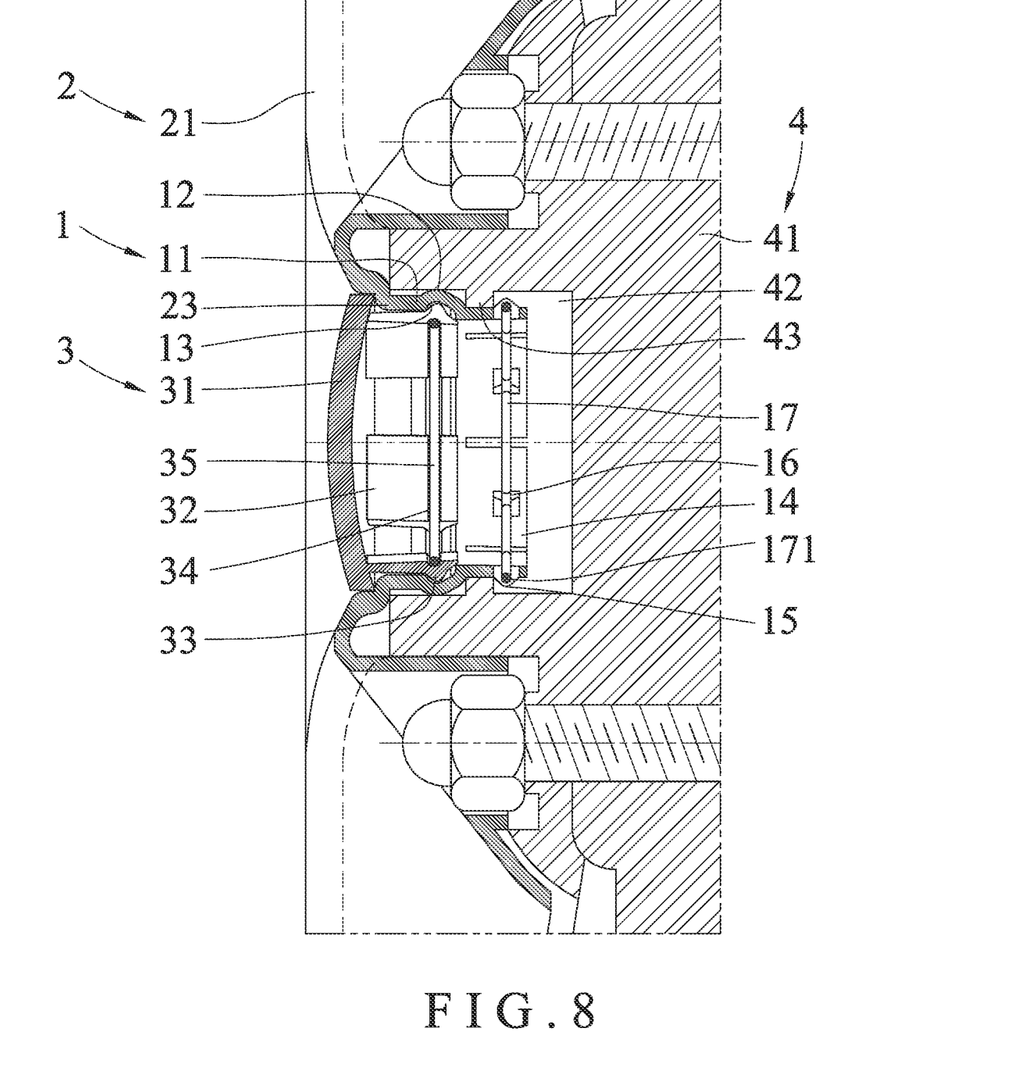
FIG. 8 is a cross-sectional view of the wheel rim assembly in accordance with the second preferred embodiment of the present invention.

Referring to FIGS. 5-8, the two ends of the positioning slot 16 of the locking ring 1 do not extend to two sides of each of the positioning pieces 14. In addition, the positioning slot 16 of the locking ring 1 is a perforation and penetrates the locking edge 15. The first elastic circle 17 is formed with multiple insertion portions 171 by bending. Each of the insertion portions 171 is inserted into the positioning slot 16 of one of the positioning pieces 14, so that the first elastic circle 17 is positioned in place. In another preferred embodiment of the present invention, the ring body 11 of the locking ring 1 and the annular wall 23 of the wheel rim cover 2 are formed integrally as shown in FIG. 8.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A wheel rim assembly comprising:
    a wheel rim, a locking ring, a wheel rim cover, and a central cap;
    wherein:
    the wheel rim has a rim body and a central hole;
    the wheel rim has an inner flange formed in the central hole;
    the locking ring includes a ring body;
    the ring body has an outside formed with an enlarged portion protruding outward;
    the ring body has an inside provided with a groove corresponding to the enlarged portion;

the ring body has an end formed with multiple positioning pieces protruding outward;
the positioning pieces are arranged annularly;
a predetermined interval is defined between the positioning pieces;
each of the positioning pieces has an outside formed with a locking edge protruding outward;
each of the positioning pieces has an inside provided with a positioning slot corresponding to the locking edge;
the positioning slot has two ends extending to two sides of each of the positioning pieces respectively;
the locking ring further includes a C-shaped first elastic circle;
the first elastic circle is mounted in the positioning slot;
the locking ring is mounted in the central hole of the wheel rim, and the locking edge is locked on the inner flange of the wheel rim;
the wheel rim cover includes a wheel rim cover body;
the wheel rim cover body has a center provided with a through hole penetrating the wheel rim cover body;
the through hole has an inside formed with a protruding annular wall;
the wheel rim cover body has an inner side face formed with multiple locking blocks;
the locking blocks are used to lock the rim body of the wheel rim, and the annular wall corresponds to the ring body;
the central cap includes a central cap body;
the central cap body has an end formed with multiple fixing plates protruding outward;
the fixing plates are arranged annularly;
a predetermined interval is defined between the fixing plates;
each of the fixing plates has an outside formed with a protruding edge;
each of the fixing plates has an inside formed with a retaining groove;
the central cap further includes a C-shaped second elastic circle mounted in the retaining groove;
the central cap extends through the through hole of the wheel rim cover and is fitted into the ring body of the locking ring, so that the protruding edge is locked in the groove, and the central cap body presses the annular wall.

2. The wheel rim assembly as claimed in claim 1, wherein the ring body of the locking ring and the annular wall of the wheel rim cover are formed integrally.

3. A wheel rim assembly comprising:
a wheel rim, a locking ring, a wheel rim cover, and a central cap;
wherein:
the wheel rim has a rim body and a central hole;
the wheel rim has an inner flange formed in the central hole;

the locking ring includes a ring body;
the ring body has an outside formed with an enlarged portion protruding outward;
the ring body has an inside provided with a groove corresponding to the enlarged portion;
the ring body has an end formed with multiple positioning pieces protruding outward;
the positioning pieces are arranged annularly;
a predetermined interval is defined between the positioning pieces;
each of the positioning pieces has an outside formed with a locking edge protruding outward;
each of the positioning pieces has an inside provided with a positioning slot penetrating the locking edge;
the locking ring further includes a C-shaped first elastic circle;
the first elastic circle is formed with multiple insertion portions by bending;
each of the insertion portions is inserted into the positioning slot of one of the positioning pieces;
the locking ring is mounted in the central hole of the wheel rim, and the locking edge is locked on the inner flange of the wheel rim;
the wheel rim cover includes a wheel rim cover body;
the wheel rim cover body has a center provided with a through hole penetrating the wheel rim cover body;
the through hole has an inside formed with a protruding annular wall;
the wheel rim cover body has an inner side face formed with multiple locking blocks;
the locking blocks are used to lock the rim body of the wheel rim, and the annular wall corresponds to the ring body;
the central cap includes a central cap body;
the central cap body has an end formed with multiple fixing plates protruding outward;
the fixing plates are arranged annularly;
a predetermined interval is defined between the fixing plates;
each of the fixing plates has an outside formed with a protruding edge;
each of the fixing plates has an inside formed with a retaining groove;
the central cap further includes a C-shaped second elastic circle mounted in the retaining groove;
the central cap extends through the through hole of the wheel rim cover and is fitted into the ring body of the locking ring, so that the protruding edge is locked in the groove, and the central cap body presses the annular wall.

4. The wheel rim assembly as claimed in claim 3, wherein the ring body of the locking ring and the annular wall of the wheel rim cover are formed integrally.

* * * * *